(12) United States Patent
Muramatsu et al.

(10) Patent No.: US 7,102,257 B2
(45) Date of Patent: Sep. 5, 2006

(54) SUBMARINE CABLE POWER FEEDING SYSTEM

(75) Inventors: Jun Muramatsu, Tokyo (JP); Katsuyoshi Kawaguchi, Yokosuka (JP); Kenichi Asakawa, Yokosuka (JP)

(73) Assignees: NEC Corporation, Tokyo (JP); Japan Marine Science and Technology Center, Kanagawa (JP)

( * ) Notice: Subject to any disclaimer, the term of this patent is extended or adjusted under 35 U.S.C. 154(b) by 484 days.

(21) Appl. No.: 10/365,412

(22) Filed: Feb. 13, 2003

(65) Prior Publication Data

US 2003/0230936 A1    Dec. 18, 2003

(30) Foreign Application Priority Data

Feb. 14, 2002    (JP) .............................. 2002-036870

(51) Int. Cl.
*H01B 7/30*    (2006.01)
*H02G 15/14*    (2006.01)

(52) U.S. Cl. ........................................ 307/147; 307/43
(58) Field of Classification Search ................. 307/43, 307/147
See application file for complete search history.

(56) References Cited

FOREIGN PATENT DOCUMENTS

EP    0495509 A2    7/1992

OTHER PUBLICATIONS

Seiichi Shimura, "Submarine Coaxial Cable Communication System", Kaitei Doujiku Keiburu Tsushin Houshiki, Mar. 25, 1979, p. 182.

*Primary Examiner*—Brian Sircus
*Assistant Examiner*—Hal I. Kaplan
(74) *Attorney, Agent, or Firm*—Sughrue Mion, PLLC

(57) ABSTRACT

A submarine cable power feeding system includes N (N is an integer of 2 or larger) main submarine cables extending from the land in the offshore direction, N-stage (N is an integer of 2 or larger) submarine feed branching devices, and first to Nth (N is an integer of 2 or larger) sub submarine cables. Each submarine feed branching device is connected to the main submarine cable to receive constant-voltage power from a constant-voltage feed unit. Each sub submarine cable connects the Nth-stage submarine feed branching device, connected to the Nth main submarine cable, to the adjacent submarine feed branching device through submarine repeaters, thereby receiving power from a constant-current feed unit. Each constant-current feed unit is built in the submarine feed branching device. The submarine feed branching devices and the submarine repeaters are arranged in a matrix on a plane.

7 Claims, 4 Drawing Sheets

SUBMARINE CABLE POWER FEEDING SYSTEM

BACKGROUND OF THE INVENTION

The present invention relates to a submarine cable power feeding system and, more particularly, to a submarine cable power feeding system for feeding power to submarine repeaters connected to submarine cables arranged in a matrix on a plane.

Hitherto, this kind of submarine power cable system for submarine cable devices is used to supply ("feed") power to one, or a plurality of, submarine repeaters from a land power supply through a feed line, where the feed line serves as a submarine cable. The repeaters are connected in series and located on the sea bottom. A method for feeding power to a plurality of submarine repeaters connected in series from a land direct current (DC) constant-current power supply through a feed line (sub-marine cable) is disclosed, for example, in an article entitled "KAITEI DOUJIKU KEIBURU TSUSHIN HOUSHIKI (submarine coaxial cable communication system)" by Seiichi Shimura, page 182, published on Mar. 25, 1979.

However, the above conventional systems have the following problems.

In the case of a constant-current power feed, it is impossible under land-based power feeding control to branch a feed line, serving as a submarine cable, to expand the arrangement of submarine repeaters into a matrix configuration on a plane. The reason is as follows. Loads on branch cables vary depending on the number of submarine repeaters connected after branching. The current consumption of a given branch is a function of each submarine repeater, and the length of the branch feed line, so that currents of the respective branches are different from each other. Thus, the power needed to be supplied to each repeater cannot be achieved with a conventional matrix configuration.

Constant-voltage parallel power feed and alternating-current (AC) power feed are not included in the existing technique for the submarine cable system. The constant-voltage parallel power feed and the AC power feed have the following problems.

For the constant-voltage power feed, a feed line as a submarine cable can be branched. However, it is necessary to extend the range of input voltages in a power supply unit of each submarine repeater. The reason is as follows. As a cable connecting the submarine repeaters becomes longer, terminal voltages of the respective submarine repeaters are not equivalent to each other due to a voltage drop caused by the resistance of the cable. It is necessary to fabricate a power supply unit of each submarine repeater in accordance with the specifications for the maximum input voltage.

Because in an AC power feed, voltage can be freely changed, land power feeding systems often use an AC power feed. However, a submarine cable has a single-wire structure. The power efficiency of single-wire AC power feed is low. Accordingly, long-distance AC power transmission has shortcomings. Furthermore, in long-distance AC power transmission/feed, the frequency has to be lowered in order to improve the transmission efficiency. For this purpose, each of the repeaters requires a transformer which transforms the AC voltage at a low frequency to that voltage corresponding to the circuit of each repeater, respectively. This results in an increase in the size of the submarine repeater. Thus the AC power feed is not suitable for use in devices disposed on the sea bottom.

SUMMARY OF THE INVENTION

It is an object of the present invention to provide a submarine cable power feeding system in which a feed line serving as a submarine cable is branched so that the matrix arrangement of submarine repeaters can be expanded on a plane.

Another object of the present invention is to provide a submarine cable power feeding system in which a feed line serving as a submarine cable can be easily extended or shortened and a submarine repeater can be easily added or removed at any time.

According to the present invention, a submarine power cable system includes arrangements extending from the land in the longitudinal direction, where these longitudinal arrangements feed constant-voltage power to submarine branching devices (10 or 10*a*) connected in the longitudinal direction with constant-voltage feed lines (2 and 2*a*), and arrangements extending in the lateral direction, where these lateral arrangements feed constant-current power with constant-current feed lines (3, 3*a*, and 3*b*) connecting the submarine feed branching devices (10 or 10*a*) in the lateral direction. According to the present invention, the arrangements in the longitudinal direction are combined with the arrangements in the lateral direction. Consequently, the arrangement of devices, such as submarine repeaters (20) requiring power feed, can be expanded to an unlimited extent into a matrix configuration on a plane.

DESCRIPTION OF THE PREFERRED EMBODIMENTS

An embodiment of the present invention will now be described in detail hereinbelow with reference to the drawings.

Figure 1:
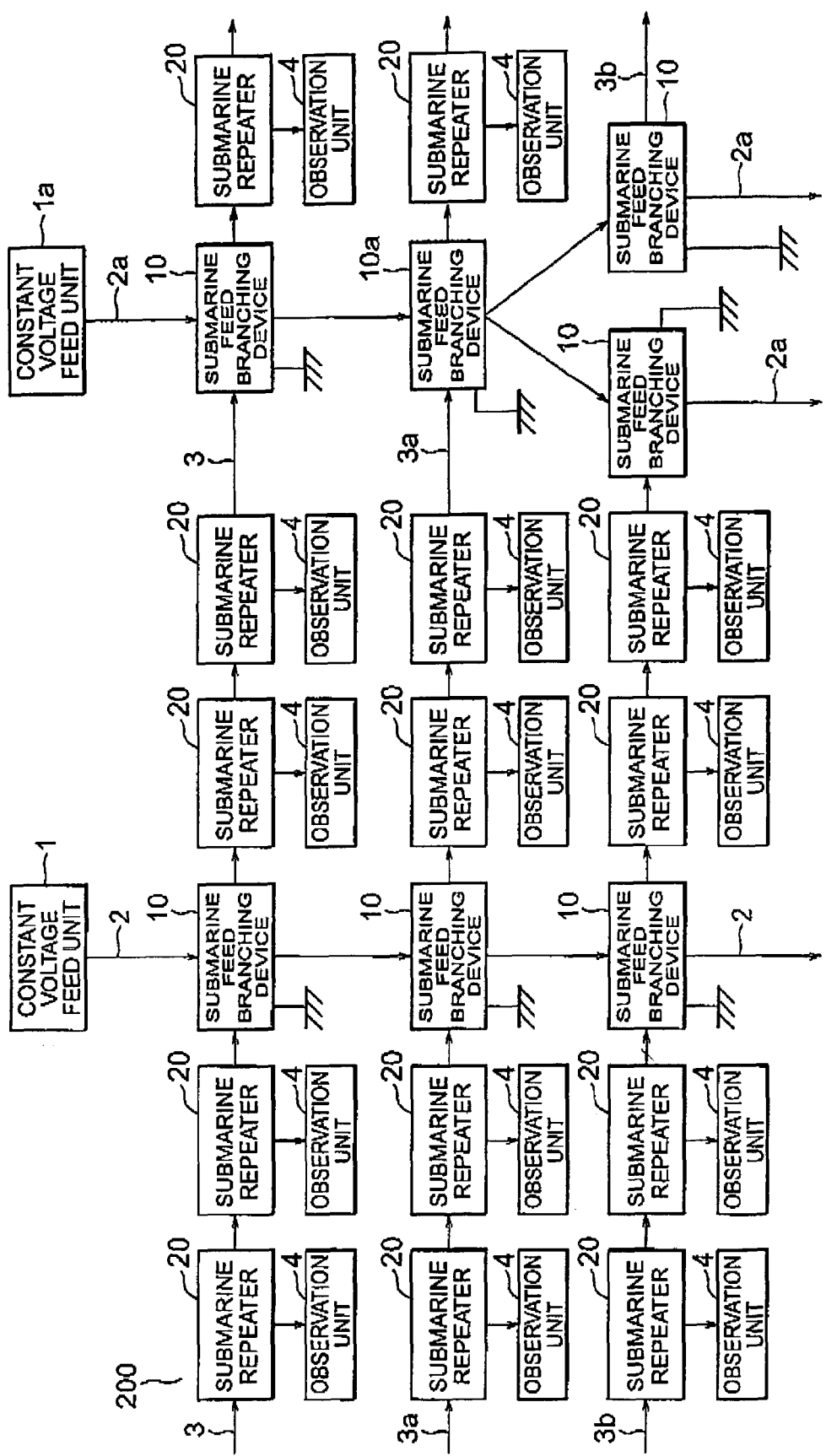
FIG. 1 is a block diagram of the configuration of a submarine cable power feeding system according to the present invention.

FIG. 1 is a block diagram of the configuration of a submarine feed branching device according to the present invention. Referring to FIG. 1, constant-voltage feed units 1 and 1*a* are disposed on the land. The constant-voltage feed units 1 and 1*a* supply constant-voltage power to submarine feed branching devices 10 through constant-voltage feed lines 2 and 2*a*, respectively The respective submarine feed branching devices 10 convert the constant-voltage power into negative (−) constant-current power and positive (+) constant-current power and then feed the constant-current power to submarine repeaters 20 through constant-current feed lines 3, 3*a*, and 3*b*. Each submarine feed branching device 10 feeds power to the next-stage submarine feed branching device 10 or 10*a* through the constant-voltage feed line 2 or 2*a*.

Each submarine feed branching device 10 converts the constant-voltage power into negative (−) constant-current power and positive (+) constant-current power and then supplies the constant-current power to submarine repeaters 20 through the constant-current feed line 3 or 3*a*. Each constant voltage feed unit 1 or 1a supplies the constant-voltage power to a plurality of stages, namely, the submarine feed branching devices 10 or 10a through the constant-voltage feed line 2 or 2a. Each submarine repeater 20 receives the constant-current power from the submarine feed branching device 10 or 10a or from another submarine repeater 20 through the constant-current feed line 3, 3a, or 3b. Each submarine repeater 20 converts the constant-current power into constant-voltage power and then supplies the constant-voltage power to an observation unit 4.

Figure 2:
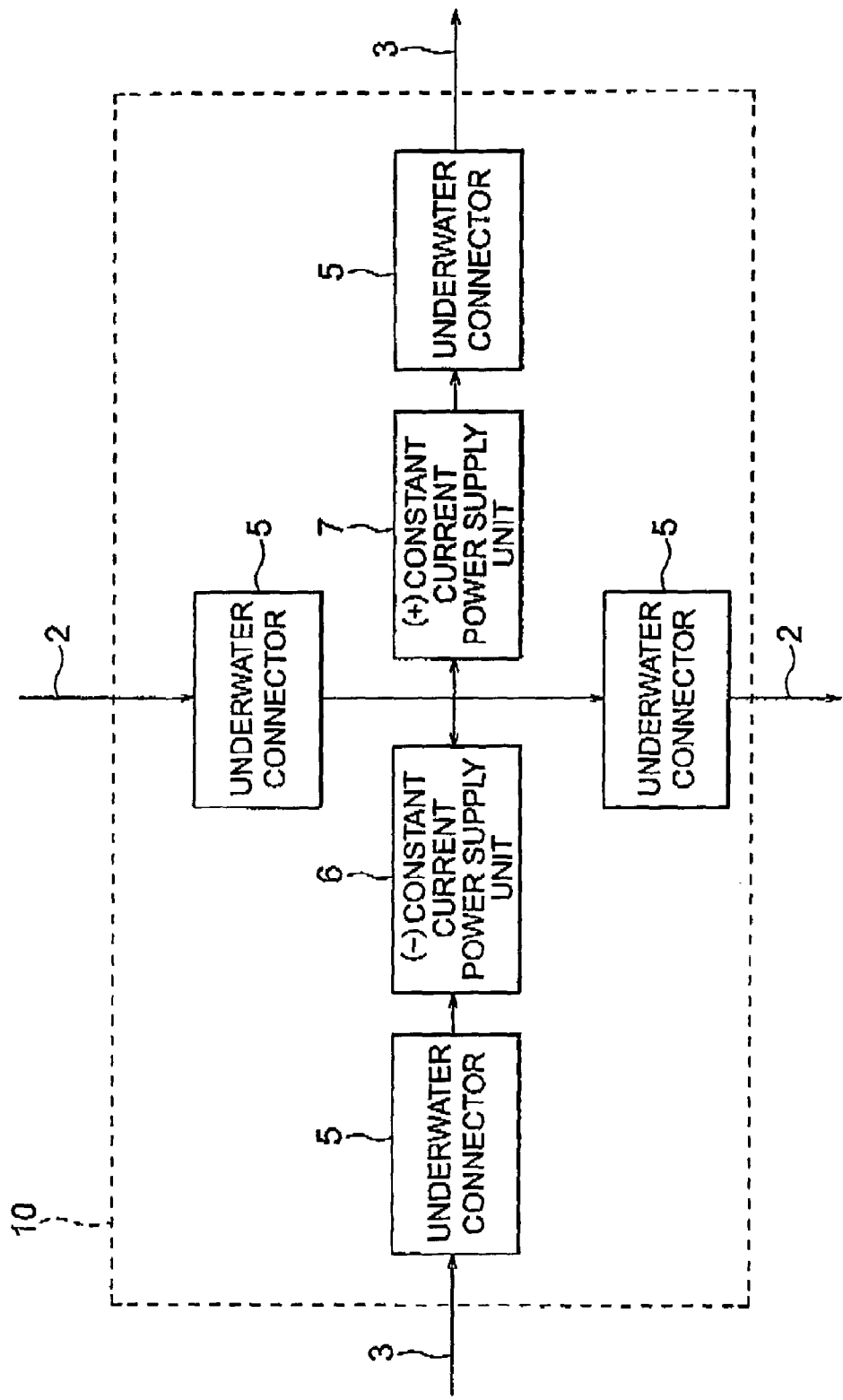
FIG. 2 is a block diagram of the configuration of a submarine feed branching device (10) in FIG. 1.

FIG. 2 shows the details of the submarine feed branching device 10 shown in FIG. 1. Referring to FIG. 2, the submarine feed branching device 10 comprises a negative (−) constant-current power supply unit 6, a positive (+) constant-current power supply unit 7, and underwater connectors 5. The negative constant-current power supply unit 6 generates negative (−) constant-current power from the constant-voltage power supplied. The positive (+) constant-current power supply unit 7 generates positive (+) constant-current power from the constant-voltage power supplied. Each underwater connector 5 connects to the constant-voltage feed line 2 or the constant-current feed line 3. Each underwater connector 5 is detachable undersea.

Figure 3:
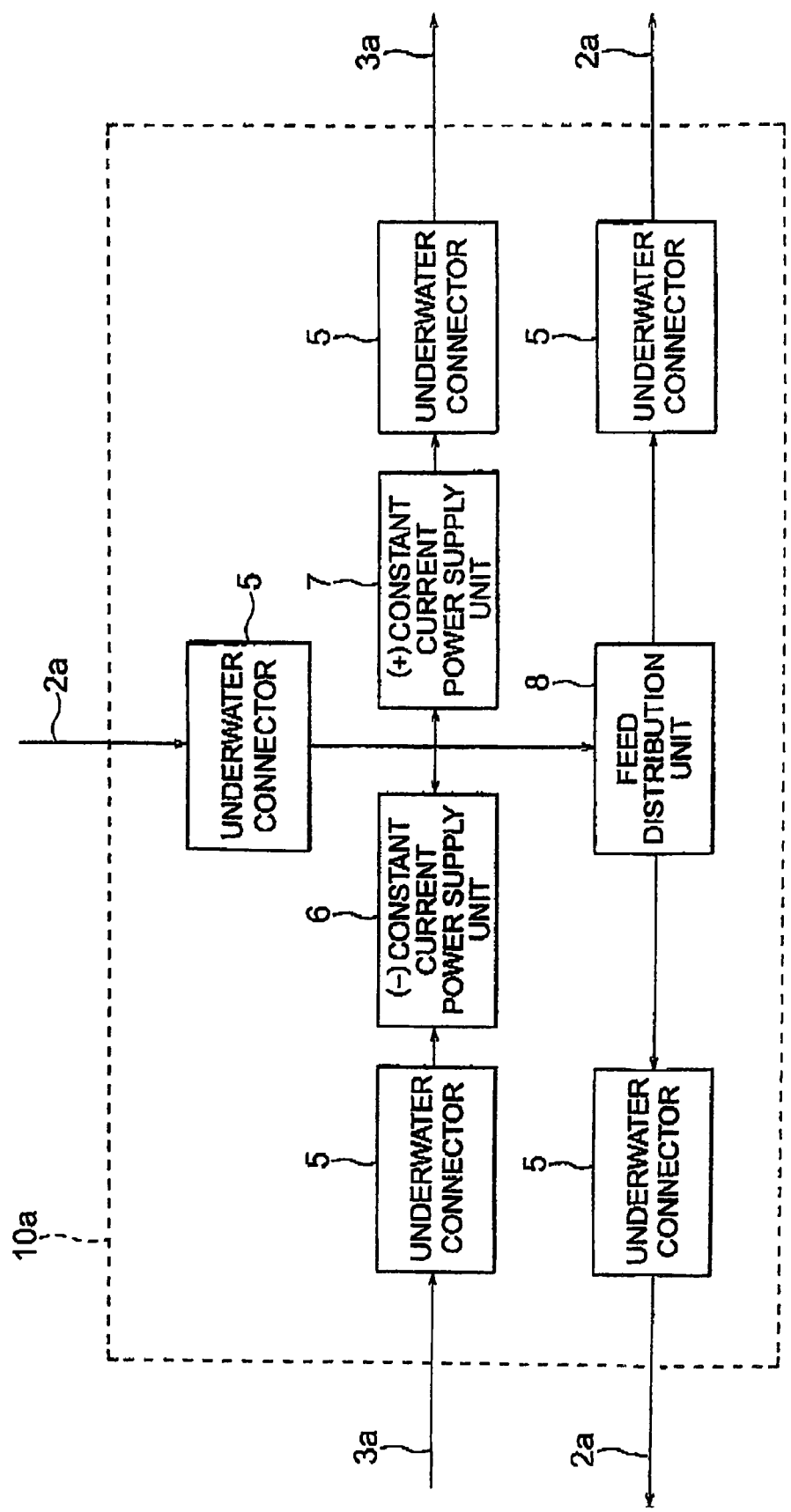
FIG. 3 is a block diagram of the configuration of a submarine feed branching device (10*a*) in FIG. 1.

FIG. 3 shows the details of the submarine feed branching device 10a of FIG. 1. Referring to FIG. 3, the submarine feed branching device 10a comprises the negative (−) constant-current power supply unit 6, the positive (+) constant-current power supply unit 7, a feed distribution unit 8 for feeding the constant-voltage power to two (or more) portions, and the underwater connectors 5. Each underwater connector 5 connects to the constant-voltage feed line 2a or the constant-current feed line 3a. FIG. 3 shows submarine feed branching device 10a having two branchings and supplying the constant voltage feed line to in two directions to two submarine branching devices 10 in row 3b. Submarine branching devices 10, in turn, supply the constant voltage feed line 2a in a third direction. It is readily appreciated that multiple dual branch submarine branching devices 10a could be connected consecutively to provide the constant voltage feed line in a plurality of directions. Each underwater connector 5 is detachable undersea.

Figure 4:
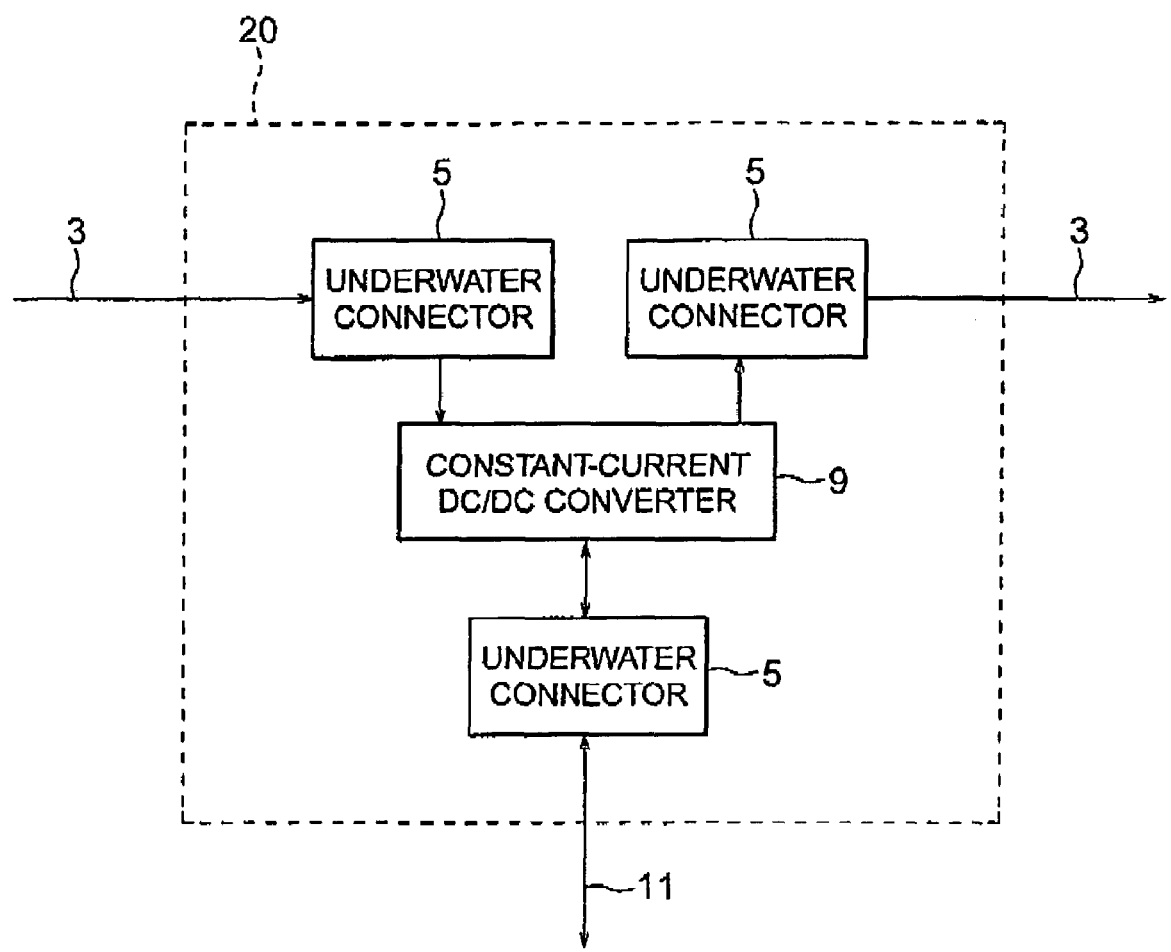
FIG. 4 is a block diagram of the configuration of a submarine repeater (20) in FIG. 1.

FIG. 4 shows the details of the submarine repeater 20 shown in FIG. 1. Referring to FIG. 4, the submarine repeater 20 comprises a constant-current DC/DC converter 9 and the underwater connectors S. The constant-current DC/DC converter 9 converts the constant-current power into constant-voltage power and then outputs the converted power to a feed line 11 for the observation unit. Each underwater connector 5 connects to the constant-current feed line 3 or the observation-unit feed line 11. Each underwater connector 5 is detachable undersea.

The configuration of the system according to the present embodiment has been described in detail. The constant-voltage feed unit and the observation unit in the diagram are well-known to those skilled in the art. These units are not directly related to the present invention. Accordingly, the detailed configurations thereof are omitted.

The operation of the submarine cable power feeding system in FIG. 1 will now be described. The constant-voltage feed unit 1 is disposed on the land. The constant-voltage feed unit 1 supplies constant-voltage power to the submarine feed branching device 10 in the first stage through the constant-voltage feed line 2. The submarine feed branching device 10 can allow the same current to flow through loads connected in series. In turn, such loads are characteristic of loads on a constant-current power feed system. The submarine feed branching device 10 provides an advantage in that power supply circuits of submarine repeaters can be made uniform with a simple construction. In order to supply power to the submarine repeaters 20 over a long distance, the submarine feed branching device 10 converts constant-voltage power into negative (−) constant-current power and positive (+) constant-current power. Thus, the constant-current power is supplied to the submarine repeaters 20 through the constant-current feed line 3. FIGS. 2 and 3 show the polarities of the constant-current power feed at this time. Each submarine repeater 20 receives the constant-current power, converts the power into constant-voltage power, and then supplies the constant-voltage power to the observation unit 4.

The constant-voltage feed line 2 serves as a constant-voltage power feed. The submarine feed branching device 10 has an advantage in that the constant-voltage feed line 2 can be extended by connection without disconnecting upstream loads. The submarine feed branching device 10 feeds constant-voltage power supplied from the constant-voltage feed unit 1 to the second-stage device 10 through the constant-voltage feed line 2. Furthermore, the submarine feed second stage branching device 10 is connected to the third-stage device 10 and the third-stage device is then connected to the fourth-stage device 10, resulting in an extension of the power feeding system. Consequently, the submarine feed branching devices 10 are arranged in the longitudinal direction with respect to the land.

For the connection, the number of necessary devices 10 can be added when required. It is unnecessary to initially set the voltage, as from a constant voltage feed unit 1 or 1a, to a high level. Accordingly, constant-voltage feed components can be economically realized. The constant-voltage power feed has the following problem. In parallel connection, the respective submarine feed branching devices 10 do not have the same terminal voltage due to a voltage drop caused by the resistance of the cable. However, the constant-voltage feed line 2 is shorter than the constant-current feed line 3 connecting the submarine repeaters 20 and the number of submarine feed branching devices 10 is smaller than that of submarine repeaters 20. Therefore, it is unnecessary to set a voltage to a high level. Accordingly, the influence on the devices is small.

The submarine feed branching device 10 is connected to a submarine feed branching device 10a to arrange more submarine feed branching devices 10 in two or more directions. In other words, the feed line can be easily branched using the characteristics of the constant-voltage power feed. The submarine feed branching devices 10a can be arranged instead of the submarine feed branching devices 10.

The submarine feed branching devices 10 and 10a can be freely connected to each other anywhere that the constant-voltage feed line 2 or 2a can be connected to the devices. The negative (−) constant-current power and the positive (+) constant-current power are supplied from each of the submarine feed branching devices 10 and 10a to the submarine repeaters 20. The submarine repeaters 20 are connected in the lateral direction. For the connections of submarine repeaters 20, a circuit can be constructed with seawater or cable returns.

The constant-voltage feed unit 1a is disposed at a distance from the constant-voltage feed unit 1 for the redundancy of the submarine feed branching device 10 depending on the connecting state of the submarine repeaters 20. In the same way as the foregoing case, the constant-voltage feed unit 1a feeds power to constant-voltage power to the first-stage submarine feed branching device 10 through the constant-voltage feed line 2a. The constant-voltage feed units 1 and 1a are similarly connected through the submarine feed branching devices 10 and 10a, and the submarine repeaters 20. Thus, the power feeding system can be expanded in a wide range.

FIG. 2 is a block diagram showing one example of the configuration of the submarine feed branching device 10 according to the present embodiment. Referring to FIG. 2, the submarine feed branching device 10 comprises the four underwater connectors 5, the negative (−) constant-current power supply unit 6, and the positive (+) constant-current power supply unit 7. The constant-voltage feed units 1 and 1a are disposed on the land. Constant-voltage power is supplied from the constant-voltage feed unit 1 or 1a, or the previous stage submarine feed branching device 10 or 10a to each underwater connector 5 through the constant-voltage feed line 2 or 2a. The negative (−) constant-current power supply unit 6 converts the supplied constant-voltage power into constant-current power and then supplies the power to the submarine repeaters 20 through the underwater connector 5 and the constant-current feed line 3. In this instance, the constant-current feed line 3a or 3b, or another constant-current feed line further connected is used in some cases. Similarly, the positive (+) constant-current power supply unit 7 supplies constant-current power through the underwater connector 5.

When the constant-voltage power feed is further extended, constant-voltage power can be supplied to the next-stage submarine feed branching device 10 or 10a through the underwater connector 5 and the constant-voltage feed line 2. Since the underwater connectors 5 are used, the power feeding system can be expanded and branched at any time.

FIG. 3 is the block diagram showing one example of the configuration of the submarine feed branching device 10a according to the present embodiment. Referring to FIG. 3, the submarine feed branching device 10a is constructed by adding the feed distribution unit 8 and one underwater connector 5 to the configuration of the submarine feed branching device 10 shown in FIG. 2. The feed distribution unit 6 distributes the constant-voltage power feed. The underwater connector 5 can supply power to the next-stage submarine feed branching device 10 or 10a. Power feed to a plurality of stages can be realized by using a plurality of underwater connectors 5.

FIG. 4 is the block diagram showing one example of the configuration of the submarine repeater 20 according to the present embodiment. Referring to FIG. 4, the submarine repeater 20 comprises three underwater connectors 5 and the constant-current DC/DC converter 9. The constant-current DC/DC converter 9 receives constant-current power from the submarine feed branching device 10 or 10b through the constant-current feed line 3 and the underwater connector 5. The constant-current DC/DC converter 9 converts the constant-current power into constant-voltage power. After the conversion, in order to supply the constant-voltage power to the observation unit 4, the constant-voltage power is supplied to the observation-unit feed line 11.

As mentioned above, according to the present embodiment, the constant-voltage power feeding arrangements in the longitudinal direction with respect to the land are combined with the constant-current power feeding arrangements in the lateral direction. Accordingly, the arrangement of devices such as submarine repeaters (20) requiring power feed can be expanded to an unlimited extent in a matrix on a plane. According to the present embodiment, various connections of the submarine feed branching devices 10a can be realized. In other words, the submarine feed branching device 10a can be connected to the constant-voltage feed unit 1 or 1a disposed on the land. The submarine feed branching devices 10a can also be connected in series.

The constant-voltage power supply unit can be constructed with direct current or alternating current.

As mentioned above, according to the present invention, the following advantages can be obtained.

Voltage can be distributed in the constant-voltage power feeding arrangement. The power supply circuits of the submarine repeaters can be formed with the same simple construction in the constant-current power feeding arrangement. The constant-voltage power feeding arrangements (for example, along 2 and 2a) can be combined with the constant-current power feeding arrangements (for example, along 3 and 3a). Accordingly, the feed line serving as the submarine cable can be branched and the arrangement of the submarine repeaters can be expanded in a matrix on a plane.

In the case of the constant-voltage power feed, power corresponding to connected loads is output. Accordingly, the extension of the feed line serving as the submarine cable and the additional installation of the submarine repeater can be easily performed later.

In the parallel connection, when a new submarine feed branching device is connected, it is unnecessary to disconnect the feed line. Accordingly, the power feeding system can be extended in the offshore direction without temporarily stopping the power feed supplied from the land.

What is claimed is:

1. A submarine cable power feeding system comprising:
   N (N is an integer greater than or equal to 2) main column submarine cables extending from land in the offshore direction;
   M (M is an integer greater than or equal to 2) stages of submarine feed branching devices, each of which is connected to an Nth main column submarine cable to receive constant-voltage power from a constant-voltage feed unit or a previous stage submarine feed branching device; and
   first to Mth rows (M is an integer greater than or equal to 2) of sub submarine cables, each of which connects an Mth-stage submarine feed branching device to other Mth stage submarine feed branching devices through submarine repeaters, wherein each submarine repeater receives power from a constant-current feed unit built into an Mth stage submarine feed branching device,
   wherein the submarine feed branching devices and the submarine repeaters are arranged in a matrix configuration on a plane.

2. A submarine cable power feeding system comprising:
   a plurality of submarine feed branching devices which are arranged in M stages (M is an integer greater than or equal to 1), wherein the stage arrangement extends from the land in the offshore direction, and which are arranged in first to Nth columns (N is an integer greater than or equal to 2) with at least two submarine repeaters interposed between two adjacent N columns, wherein submarine feed branching devices are M times N in number;
   first to Nth column (N is an integer greater than or equal to 2) constant-voltage feed units for supplying constant-voltage power to first-stage submarine feed branching devices in the first to Nth columns, respectively; and
   a constant-current feed unit which is included in each submarine feed branching device and which supplies constant-current power to an interval between the corresponding submarine feed branching device and an adjacent submarine feed branching device located in an adjacent column.

3. The system as claimed in claim 1 or 2, wherein
the first to Nth column constant-voltage feed units, disposed on the land, supply constant-voltage power to the first-stage submarine feed branching devices in the first to Nth columns through constant-voltage feed lines, respectively, each submarine feed branching device converts the constant-voltage power into negative (−) constant-current power and positive (+) constant-current power and then distributes the power to the submarine repeaters located between the corresponding submarine feed branching device and an adjacent submarine feed branching device in the next column through a constant-current feed line, each submarine repeater which receives constant-current power, converts the constant-current power into constant-voltage power, and then supplies the constant-voltage power to an observation unit corresponding thereto, the respective first stage submarine feed branching devices supply the constant-voltage power, supplied from the respective corresponding constant-voltage feed units, to second-stage submarine feed branching devices in the first to Nth columns through constant-voltage feed lines without disconnecting the constant-voltage feed lines, and the power feed is repeated while feed connection is being extended to the Mth-stage submarine feed branching devices, the arrangement of the submarine feed branching devices extending to the longitudinal direction from the land.

4. The system as claimed in claim 3, wherein
each submarine feed branching device comprises two underwater connectors for the corresponding main column submarine cable and two underwater connectors for the submarine cable, namely, four underwater connectors in total, a negative (−) constant-current power supply unit, and a positive (+) constant-current power supply unit, the corresponding constant-voltage feed unit or the submarine feed branching device in the preceding stage supplies constant-voltage power to the underwater connectors through the main column submarine cable through the constant-voltage feed line, the negative (−) constant-current power supply unit converts the supplied constant-voltage power into constant-current power and then supplies the constant-current power to an adjacent the submarine repeater through the underwater connector through the submarine cable and the constant-current feed line.

5. The system as claimed in claim 3, wherein
each submarine feed branching device comprises:
a negative constant-current power supply unit for generating a negative (−) constant current from constant-voltage power supplied;
a positive constant-current power supply unit for generating a positive (+) constant current;
a feed distribution unit for feeding constant-voltage power to two portions or more; and
underwater connectors each of which is connected to the constant-voltage feed line and each of which is detachable and can be attached undersea, and
constant-voltage power feed can be distributed in two directions or more, so that the arrangement of the constant-voltage feed lines, the constant-current feed lines, and the submarine repeaters can be expanded.

6. The system as claimed in claim 4, wherein each submarine repeater comprises:
a constant-current DC/DC converter for converting constant-current power to constant-voltage power and then outputting the constant-voltage power to a feed line for an observation unit; and
underwater connectors, each of which is connected to the constant-current feed line or the feed line for the observation unit and each of which is detachable undersea.

7. The system as claimed in claim 5, wherein each submarine repeater comprises:
a constant-current DC/DC converter for converting constant-current power to constant-voltage power and then outputting the constant-voltage power to a feed line for an observation unit; and
underwater connectors, each of which is connected to the constant-current feed line or the feed line for the observation unit and each of which is detachable undersea.

* * * * *

UNITED STATES PATENT AND TRADEMARK OFFICE
CERTIFICATE OF CORRECTION

PATENT NO.        : 7,102,257 B2                                              Page 1 of 1
APPLICATION NO.   : 10/365412
DATED             : September 5, 2006
INVENTOR(S)       : Jun Muramatsu, Katsuyoshi Kawaguchi and Kenichi Asakawa It is certified that error appears in the above-identified patent and that said Letters Patent is hereby corrected as shown below:

Column 4, line 17, delete "connection", and insert --connecting an addition connector to a downstream connector--.

Signed and Sealed this

Sixteenth Day of January, 2007

JON W. DUDAS
*Director of the United States Patent and Trademark Office*